United States Patent [19]

Borsboom

[11] 3,777,122
[45] Dec. 4, 1973

[54] PROCESS AND APPARATUS FOR THE AUTOMATIC CONTROL OF A VARIABLE

[75] Inventor: Albertus C. H. Borsboom, Amsterdam, Netherlands

[73] Assignee: Shell Oil Company, New York, N.Y.

[22] Filed: July 30, 1971

[21] Appl. No.: 167,717

[52] U.S. Cl. .............................. 235/150.1, 318/615
[51] Int. Cl. ......................................... G05b 11/01
[58] Field of Search.................... 318/615, 616, 617, 318/619, 620, 621, 622, 635, 609, 610; 235/150.1

[56] References Cited
UNITED STATES PATENTS
3,201,675   8/1965   Curran et al..................... 318/635 X Primary Examiner—Eugene G. Botz
Attorney—John G. Graham et al.

[57] ABSTRACT

A control system for a variable wherein the maximum rate of change of the variable is controlled by limiting the error signal. The error signal is controlled so that the control system operates linearly with time when the error signal exceeds the limit and proportionally and integrally when the error signal is less than the limit.

9 Claims, 9 Drawing Figures

PROCESS AND APPARATUS FOR THE AUTOMATIC CONTROL OF A VARIABLE

BACKGROUND OF THE INVENTION

The invention relates to a process and an apparatus for the automatic control of a variable, particularly of the rate of change of that variable.

In technical practice it often happens that a rapid change of a variable is desired but that, on the other hand, account should be taken of the risk of equipment or parts of equipment becoming overloaded. Notably this happens in the case of steam-driven equipment, such as, for instance, a ship's propeller driven by a steam turbine. Here provision should be made to prevent a required sudden change in the number of revolutions from causing damage to the turbine or undesired operational conditions in the boiler. The above-mentioned risks are present especially with equipment that is remotely controlled without intermediary action of technical personnel, such as ship's propulsion machinery that is operated from the bridge. The invention provides a solution for these problems.

SUMMARY OF THE INVENTION

According to the invention, for the automatic control of a variable:

a. the actual value of that variable is measured and converted into a corresponding signal ($n_a$), b. the desired value of that variable is set and converted into a corresponding signal ($n_b$), c. the difference between the signals mentioned under (a) and (b) is determined, which results in a signal $\epsilon = n_b - n_a$, d. the signal $\epsilon$ mentioned under (c), from which a signal $X$, to be mentioned herein after under (g), is subtracted, is amplified in an amplifier with a high gain $A$, which results in an output signal $z = -A(\epsilon - X)$, e. the signal $z$ mentioned under (d) is limited so as not to exceed an upper-positive-value and a lower-negative-value, which results in a signal $z'$, f. the signal $z'$ mentioned under (e) is integrated, which results in a signal $I = - \int z' dt$, g. the signal $I$ mentioned under (f) is subjected to a differentiating operation, which results in a signal $X$ that is determined by the equation $N \, dX/dt + X = N \, dI/dt$, where $N$ is a network constant, h. the signal $X$ mentioned under (g) is subtracted, as already indicated under (d), at the input of the amplifier mentioned there, from the signal $\epsilon$ mentioned under (c), i. the signal $I$ mentioned under (f) is used for adjusting the variable.

In elucidating the invention the application to the control of the number of revolutions of a ship's propeller, driven by a steam turbine, will be taken as an example, but the invention is by no means restricted to this. The invention can also be applied to moving mechanical systems such as radar aerials, cranes, etc.

The signal $n_a$ then represents the actual number of revolutions of the ship's propeller, the signal $n_b$ the desired number of revolutions. The signal $n_b$ can be generated, for instance, by putting the ship's telegraph on the bridge in a specific position.

The difference signal $\epsilon$ may suddenly become large when from the bridge a large increase in the number of revolutions of the ship's propeller is requested, for instance "full ahead." Then $z$ will temporarily be larger than the set upper-positive-value. The signal $z'$ now is equal to that upper value and this signal remains constant as long as $\epsilon$ is larger than or equal to that value. During this period, as a result of the integration a signal $I$ is obtained which increases linearly with time. By similar reasoning it can be argued that upon a desired large decrease in the number of revolutions the signal I decreases linearly with time as long as $z$ is smaller than or equal to the lower-negative-value. As the signal $I$ is used for adjusting the supply of steam to the turbine, appropriate selection of the limiting values will result in a reduction of the rate of change of the number of revolutions and of the steam supply.

According to the elucidation so far, the actual number of revolutions $n_a$ will approach the desired number of revolutions $n_b$ more closely. The signal $z$ decreases and eventually enters the range between the limiting values. Then the integration signal $I$ will no longer change linearly with time but will change at a decreasing rate. The signal $\epsilon$ now directly influences the control of the number of revolutions, which means that the control circuit now is closed. It is of importance that the control circuit as discussed so far in the elucidation has a very high gain (A), which is undesirable because, as a result, $n_b$ and $n_a$ do not become equal and the actual number of revolutions $n_a$ in fact starts oscillating between the numbers of revolutions determined by the two limiting values. By deriving the signal $X$ from the signal $I$ and by subtracting this signal $X$ at the input of the amplifier from the signal $\epsilon$, feedback is effected which imparts proportional and integral action to the control circuit. It is of importance in this connection that the amplifier has a high gain, for instance a gain of at least 1,000. Then, due to the feedback the input of the amplifier has a potential which is substantially zero and $n_a$ and $n_b$ can become equal.

It is preferred that the aforementioned upper-positive-value and the lower-negative-value have the same absolute value, indicated more specifically by $l$. Then the rate of change of the value position is the same during an increase and during a decrease in the demanded number of revolutions.

The limiting values can be derived from the aforementioned signal $I$, in such a way that at small absolute values of $I$ the absolute value of $l$ is large. In this way it is ensured that the rate of change of the steam supply can be made the same over the entire range of the boiler load by providing for the limiting values to be dependent on the load in an appropriate way. The latter depends on the valve characteristic, for which allowance can also be made in the relationship between $I$ and $l$.

The limiting values can be derived from the boiler load in a more direct manner by measuring the mass flow rate of the steam supplied to the turbine, by differentiating the measured value and by comparing the absolute value of that differential with a set value in a controller having proportional action, of which controller the output signal is used for setting the values $+l$ and $-l$.

In this way it is ensured that the rate of change of the steam supply will be approximately constant if the signal $z$ is so as not to exceed $+l$ or $-l$.

Processing the measured signals as indicated hereinbefore can be done by equipment to be discussed hereinafter, but may also be done entirely or partly by a digital computer with appropriate program.

An apparatus suitable for carrying out the process according to the invention consists of:

aa. a meter measuring the actual value of that variable, bb. a component for setting the desired value of that variable, cc. a subtracting element, of which one input is connected to the meter mentioned under (aa) and the other input to the component mentioned under (bb), dd. an amplifier with a high gain, whose input is connected to the output of the subtracting element mentioned under (cc), ee. a selector for the largest incoming signal, of which one input is connected to the output of the amplifier mentioned under (dd), ff. a selector for the smallest incoming signal, of which one input is connected to the output of the selector mentioned under (ee), gg. an integrator, of which the input is connected to the output of the selector mentioned under (ff), hh. a correcting unit for the said variable, connected to the output of the integrator mentioned under (gg), ii. a network, connected to the output of the integrator mentioned under (gg) and to the input of the amplifier mentioned under (dd).

The signal $A(\epsilon - X)$ can be obtained by supplying $\epsilon$ and $-X$ to the amplifier mentioned under (dd). Also, the said amplifier may be a difference amplifier if the sinals $\epsilon$ and $+X$ are supplied.

The netowrk mentioned under (ii) may consist of an inverting amplifier and a differentiating circuit. Then signal $-X$ is obtained and the amplifier mentioned under (dd) is a summing amplifier. If the inverting amplifier is not present, then the amplifier mentioned under (dd) is a difference amplifier.

The apparatus may be provided with a fuction generator whose input is connected to the output of the integrator mentioned under (gg), which function generator has an output for positive signals that is connected to the other input of the selector mentioned under (ee) as well as an output for negative signals that is connected to the other input of the selector mentioned under (ff), which function generator is capable of generating signals $+l$ and $-l$, of which the absolute value is large when the absolute value of $I$ is small.

Another embodiment of the apparatus according to the invention, suitable for application to a steam turbine installation on board a ship for driving the ship's propeller, where the number of revolutions of the ship's propeller is the variable referred to, comprises a meter measuring the mass flow rate of the steam supplied to the turbine, which meter is connected to an element that is capable of providing the absolute value of the differential of the incoming signal, of which element the output is connected to the input for the measured value of a controller having proportional action, of which the output is connected to the input for the signal $+l$ of the selector mentioned under (ee), and of which controller the output is also connected, via an inverting amplifier, to the input for the signal $-l$ of the selector mentioned under (ff).

THE DRAWINGS

The invention will now be further elucidated with reference to the drawings, wherein:

FIGS. 1a – 1e are graphic representations, as a function of time, of signals appearing in the system of FIG. 1;

DETAILED DESCRIPTION OF PREFERRED EMBODIMENTS

Figure 1:
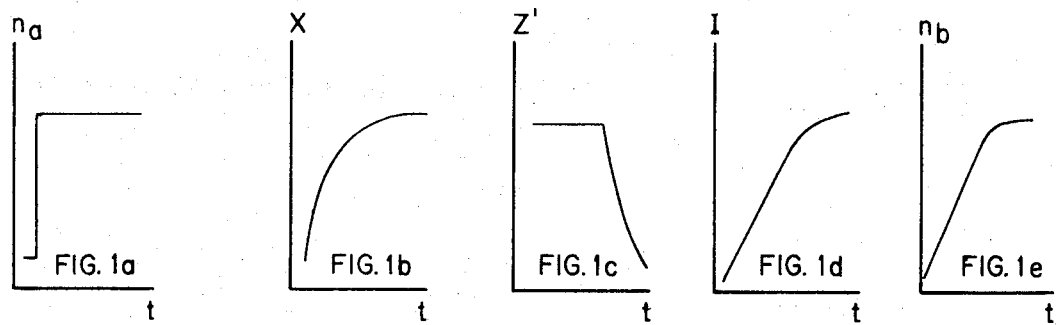
FIG. 1 is a block diagram of a control circuit according to the invention.
Figure 1:
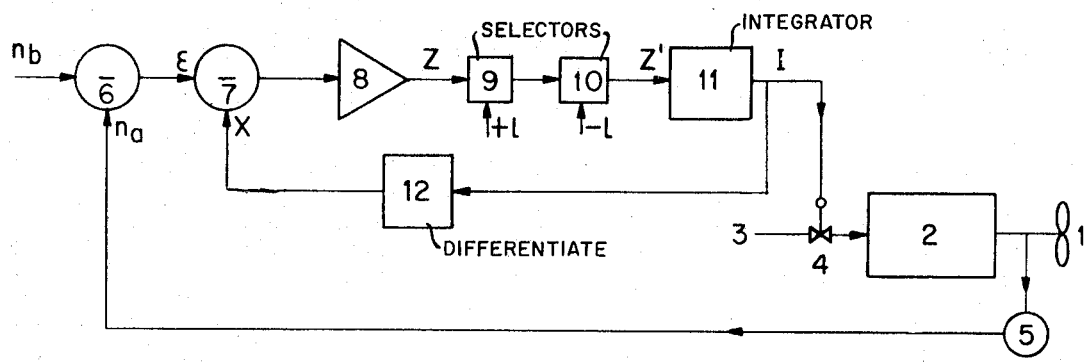

In FIG. 1 item 1 is the ship's propeller, driven by a steam turbine 2. In the supply line 3 for steam there is a valve 4. The number of revolutions of the propeller 1 is measured by meter 5, which results in the signal $n_b$. By means of the ship's telegraph, which is not indicated, the desired number of revolutions $n_a$ is set. In element 6 the two signals are subtracted from each other, which results in the signal $\epsilon = n_a - n_b$. In element 7 a signal $X$, to be discussed hereinafter, is subtracted from $\epsilon$ and the difference is supplied to amplifier 8 having a high gain A. This yields the signal $z = -A(\epsilon - X)$. The signal Z goes to selector 9 which also receives an adjustable signal $+l$. Of these two signals the smaller one is allowed to pass. In selector 10 the signal which selector 9 has allowed to pass is compared with an adjustable signal $-l$. Of these two signals the larger one is allowed to pass. The signal $z'$ thus obtained is supplied to integrator 11, which generates the signal $I = \int z' dt$. The signal $I$ is converted by means of differentiating network 12 into the signal $X$ which in element 7 is subtracted from the signal $\epsilon$. The signal $X$ meets the requirement $N\, dX/dt + X = N\, dI/dt$, where $N$ is a network constant. By means of the signal $I$ The position of valve 4 in the steam line 3 is adjusted. In FIGS. 1a – 1e the various signals have been plotted as a function of the time, $t$, on the basis of a stepwise change in the desired signal $n_a$.

Figure 2:
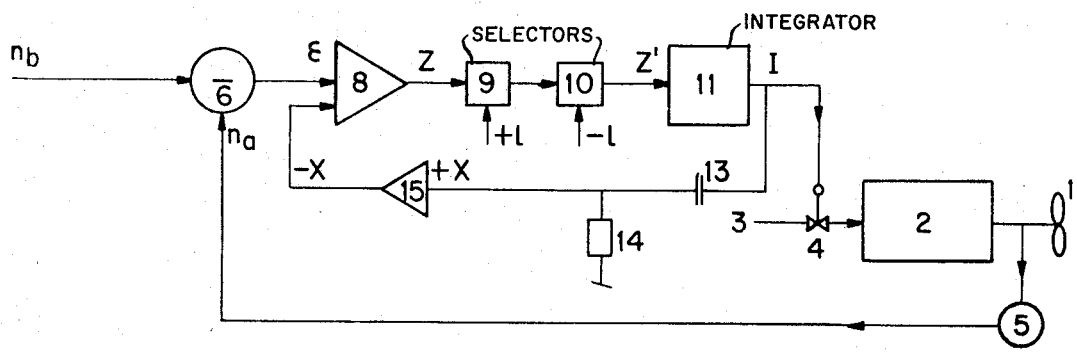
FIG. 2 is a block diagram of the system of FIG. 1, showing the feedback network in more detail.

In FIG. 2 the network 12 is further elucidated. In this and in further figures numerals and symbols used earlier have the same meaning as before. The differentiating network 12 consists of a capacitor 13 ($C$) and a resistor 14 ($R$). For the network the equation $(I - X)pC = X/R$ holds, in which $p$ = the Laplacian operator. From this it follows that $pCRI = X(1 + pCR)$ or $I/X = 1 + pCR/pCR) = 1 + p\,\tau/\, p\tau = 1 + 1/p\tau$ where $\tau = RC$. In the situation where the selectors are not required to perform their limiting action, the control circuit with high gain $A$ is closed and $\epsilon = X$. Then $I = [1 + (1/p\epsilon]\, \epsilon$, or $I = \epsilon + (1/\tau) \int \epsilon dt$.

From this it follows that the control circuit has proportional and integral action, which is an essential condition for the requirement that $n_a = n_b$ to be met. It is of importance in this connection that in the control circuit according to the invention this control action is combined with the limitations to $+l$ and $-l$, so that when a large change is required the number of revolutions $n_a$ at first increases or decreases at a limited rate and subsequently changes at a decreasing rate so as to reach the value that is demanded.

As in this example the amplifier 8 is a summing amplifier, the sign of the signal $X$ in the inverting amplifier 15 is reversed.

Figure 3A:
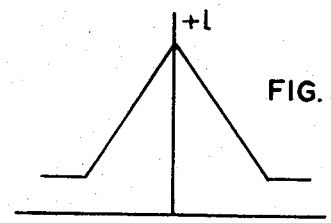
FIG. 3 is a block diagram of a modified version of the system of FIG. 1, including a function generator.
Figure 3:
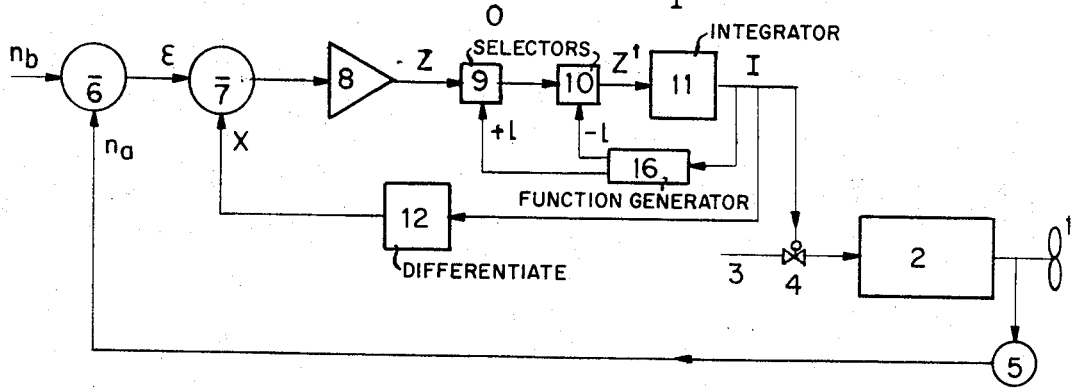

In the example represented in FIG. 3 the signal $I$ is also supplied to a function generator 16. This generator generates a signal $+l$ as represented in FIG. 3a. This signal passes to the selector 9. In addition, the function generator 16 supplies a signal $-l$ which otherwise has the same shape as $+l$, which signal passes to the selector 10. If the absolute value of $I$ is small, the absolute value of $l$ is large.

Figure 4:
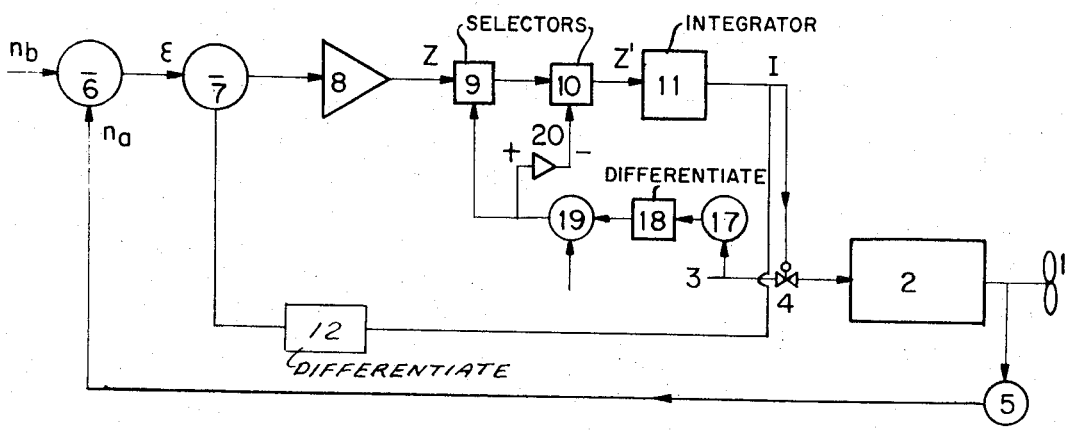
FIG. 4 is a block diagram of another modified version of the system of FIG. 1.

In the example represented in FIG. 4, in order to obtain the signals $+l$ and $-l$ the mass flow rate of the steam flowing through line 3 is measured by meter 17. The measured value is differentiated in element 18. The absolute value of this differential passes to controller 19, which has proportional action. The output signal passes to selector 9, and, after reversal of the sign in the inverting amplifier 20, to selector 10. The set value of controller 19 determines the maximum rate of change of the steam supply to the turbine 2.

We claim as our invention:

1. A process for the automatic control of a variable, particularly of the rate of change of the variable, comprising the steps of:
   a. measuring the actual value of the variable and producing a corresponding signal ($n_a$),
   b. setting the desired value of the variable and producing a signal ($n_b$) corresponding to the desired value,
   c. determining the difference between the signals $n_a$ and $n_b$ which results in a signal $\epsilon = n_b - n_a$,
   d. amplifying the signal $\epsilon$ from which a signal $X$ is subtracted in an amplifier with a high gain $A$, which results in an output signal $z = -A(\epsilon - X)$.
   e. limiting the signal $z$ so as not to exceed an upper-positive-value $+l$ and a lower-negative-value $-l$, which results in a signal $z'$,
   f. integrating the signal $z'$ which results in a signal $I = -\int z'dt$,
   g. differentiating the signal $I$ which results in a signal $X$ that is determined by the equation $N(dX/dt) + X = N(dI/dt)$, where $N$ is a network constant,
   h. subtracting the signal $X$ as already indicated under (d), at the input of said high gain amplifier from the signal $\epsilon$ and
   i. adjusting the variable in response to the signal $I$.

2. A process according to claim 1, which process is applied to a steam turbine installation on board a ship for driving the ship's propeller, the signal $n_a$ representing the actual number of revolutions of the ship's propeller, the signal $n_b$ representing the desired number of revolutions and the signal $I$ being used for adjusting the steam supply to the turbine.

3. A process according to claim 1 in which the upper-positive-value and the lower-negative-value have the same absolute value, namely $l$.

4. A process according to claim 3 in which the upper-positive- and the lower-negative-value are derived from the signal $I$ in such a way that if the absolute value of $I$ is small the absolute value of $l$ is large.

5. A process according to claim 2 in which the upper-positive-value and the lower-negative-value are obtained by measuring the mass flow rate of the steam supplied to the turbine, by differentiating the measured value and by comparing the absolute value of that differential with a set value to obtain an output signal used for setting the values $+l$ and $-l$.

6. An apparatus for the automatic control of a variable, which apparatus comprises:
   aa. a meter measuring the actual value of that variable,
   bb. a component for setting the desired value of that variable,
   cc. a subtracting element, of which one input is connected to the meter and the other input to the component,
   dd. an amplifier with a high gain, whose input is connected to the output of the subtracting element,
   ee. a first selector for the largest incoming signal, of which one input is connected to the output of the amplifier,
   ff. a second selector for the smallest incoming signal, of which one input is connected to the output of the first selector,
   gg. an integrator, of which the input is connected to the output of the second selector,
   hh. a correcting unit for the said variable, said correcting unit being connected to the output of the integrator,
   ii. a network, connected to the output of the integrator and to the input of the amplifier.

7. An apparatus according to claim 6, in which apparatus the network consists of an inverting amplifier and a differentiating circuit.

8. An apparatus according to claim 6, which apparatus, in addition includes a function generator whose input is connected to the output of the integrator, which function generator has an output for positive signals that is connected to the other input of the first selector as well as an output for negative signals that is connected to the other input of the second selector, which function generator is capable of generating an upper positive value signal $+l$ and a lower positive value signal $-l$, of which the absolute value is large when the absolute value of $I$ is small.

9. An apparatus according to claim 6, suitable for application to a steam turbine installation on board a ship for driving the ship's propeller, in which the number of revolutions of the ship's propeller is the variable referred to, which apparatus in addition includes a meter measuring the mass flow rate of the steam supplied to the turbine, which meter is connected to an element that is capable of providing the absolute value of the differential of the incoming signal, of which element the output is connected to the input for the measured value of a controller having proportional action, of which the ouput is connected to the other input of the first selector, and of which controller the output is also connected, via an inverting amplifier, to the other input of the second selector.

* * * * *